Patented Sept. 3, 1929.

1,726,681

UNITED STATES PATENT OFFICE.

ALBERT SCHMELZER AND FRIEDRICH MUTH, OF ELBERFELD, AND EUGEN GLIETEN-BERG, OF LEVERKUSEN-ON-THE-RHINE, GERMANY, ASSIGNORS TO GENERAL ANILINE WORKS, INC., OF NEW YORK, N. Y., A CORPORATION OF DELAWARE.

NEW AZO DYE.

No Drawing. Application filed December 20, 1927, Serial No. 241,452, and in Germany December 22, 1926.

The present invention relates to new and valuable azo dyestuffs which are obtainable by coupling a diazotized amino-carbazole compond with a 2.3-hydroxy-naphthoic acid arylide and which correspond to the general formula:

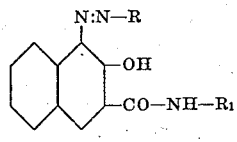

wherein R stands for a carbazole residue which may be substituted and $R_1$ for an aryl residue of the benzine or naphthalene series which may be substituted. When produced on the fibre generally clear violet shades of excellent fastness to chlorine, light and boiling are obtained.

Our new products are in a free form and in a dry state dark powders which are soluble in concentrated sulfuric acid with a yellowish brown coloration.

By reduction with zinc and hydrochloric acid 1-amino-2-hydroxy-3-naphthoic acid-arylide and an amino-carbazole are obtained.

The coupling process may be carried out on a substance or on fibre.

The following examples serve to illustrate our invention:—

*Example 1.*—Cotton yarn, which has been boiled out and dried, is impregnated with a solution containing 3 grams of 2.3-hydroxy-naphthoic acid-ortho-toluidide, 20 ccm. of caustic soda lye of 34° Bé., and 25 ccm. of Turkey red oil per liter; after removing the excess of the impregnating solution development takes place by immersing without drying in a diazo solution, (the mineral acid of which has been neutralized by sodium acetate), which contains 2 grams of 1-amino-carbazole m. p. 195–196° C. per liter, the goods are then rinsed and soaped. Very beautiful red violet shades of good fastness to light are thus obtained. The dyestuff has the following formula:

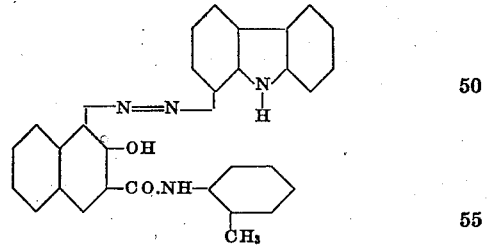

*Example 2.*—By employing di-2.3-hy-droxynaphthoic acid dianisidide and 2-amino-3.6-dichlorocarbazole red violet shades are obtained, likewise possessing satisfactory fastness properties. The dyestuff has the following formula:

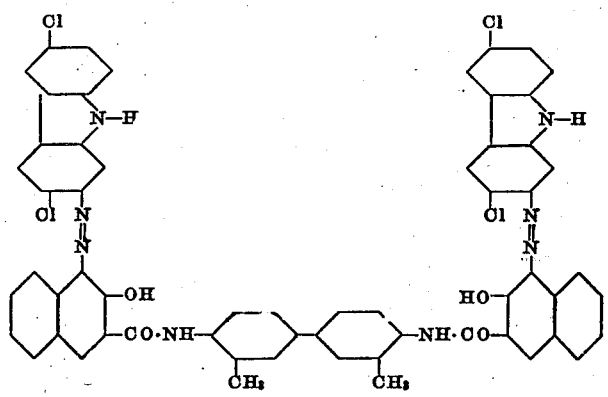

One can use other diazotized amino-carbazoles, e. g. such derived from 2-, 3- or 4-amino-carbazoles or other arylides of the 2-hydroxy-3-naphthoic acid e. g. the alpha- or beta-naphthylamide, para-phenetidide, para-anisidide etc.

We claim:

1. Process for the manufacture of azo dyestuffs, which are insoluble in water, by coupling a diazo compound of an unsulfonated monoamino carbazole compound with an arylide of 2.3-hydroxynaphthoic acid.

2. As new products azo dyestuffs of the general formula:

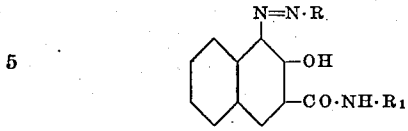

in which R' stands for a carbazole residue which may be substituted and $R_1$ for an aryl residue which may be substituted, which products are in a free and dry state generally dark powders soluble in concentrated sulfuric acid with a yellowish brown coloration, dyeing when produced on the fibre clear violet shades of excellent fastness to chlorine, light and boiling and yielding upon reduction with zinc and hydrochloric acid an 1-amino-2-hydroxy-3-naphthoic acid arylide and an aminocarbazole.

3. As new products azo dyestuffs of the general formula:

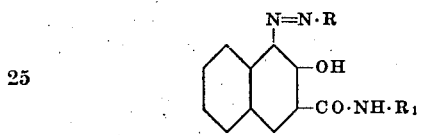

in which R is a carbazole residue which may be substituted, $R_1$ a benzene residue which may be substituted, which products are in a free and dry state generally dark powders soluble in concentrated sulfuric acid with a yellowish brown coloration, dyeing when produced on the fibre clear violet shades of excellent fastness to chlorine, light and boiling, and yielding upon reduction with zinc and hydrochloric acid an 1-amino-2-hydroxy-3-naphthoic acid naphthalide and an aminocarbazole.

4. As a new product the azo dyestuff of the formula:

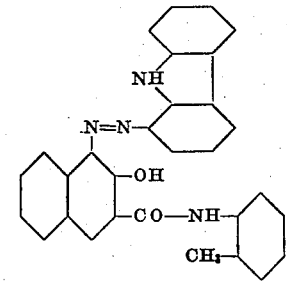

which is in a dry and free state a dark powder dissolving in sulfuric acid with a yellowish-brown coloration and dyeing when produced on the fibre clear red-violet shades of excellent fastness to chlorine, to light and to boiling, and yielding upon reduction with zinc and hydrochloric acid 1-aminocarbazole and 1-amino-2-hydroxy-3-naphthoic acid ortho-toluidide.

5. As new products, fibres dyed with a dyestuff claimed in claim 2.

6. As new products, fibres dyed with a dyestuff claimed in claim 3.

7. As new products, fibres dyed with the dyestuff claimed in claim 4.

In testimony whereof we have hereunto set our hands.

ALBERT SCHMELZER.
FRIEDRICH MUTH.
EUGEN GLIETENBERG.